(12) United States Patent
Chen et al.

(10) Patent No.: US 11,328,411 B2
(45) Date of Patent: May 10, 2022

(54) PRINT CHECK REPEATER DEFECT DETECTION

(71) Applicant: KLA Corporation, Milpitas, CA (US)

(72) Inventors: Hong Chen, San Ramon, CA (US); Kenong Wu, Davis, CA (US); Xiaochun Li, San Jose, CA (US); James A. Smith, Los Altos, CA (US); Eugene Shifrin, Sunnyvale, CA (US); Qing Luo, Fremont, CA (US); Michael Cook, Windsor (GB); Wei Si, Shanghai (CN); Leon Yu, Shanghai (CN); Bjorn Brauer, Beaverton, OR (US); Nurmohammed Patwary, San Jose, CA (US); Ramon Ynzunza, Milpitas, CA (US); Neil Troy, San Jose, CA (US)

(73) Assignee: KLA Corp., Milpitas, CA (US)

( * ) Notice: Subject to any disclaimer, the term of this patent is extended or adjusted under 35 U.S.C. 154(b) by 0 days.

(21) Appl. No.: 17/246,034

(22) Filed: Apr. 30, 2021

(65) Prior Publication Data

US 2021/0342992 A1 Nov. 4, 2021

Related U.S. Application Data

(60) Provisional application No. 63/019,445, filed on May 4, 2020.

(51) Int. Cl.
*G06T 7/00* (2017.01)
*G01N 21/88* (2006.01)
*G01N 21/95* (2006.01)

(52) U.S. Cl.
CPC .......... *G06T 7/001* (2013.01); *G01N 21/8851* (2013.01); *G01N 21/9501* (2013.01);
(Continued)

(58) Field of Classification Search
CPC .......... G06T 7/001; G06T 2207/30148; G01N 21/8851; G01N 21/9501; G01N 2021/8864
(Continued)

(56) References Cited

U.S. PATENT DOCUMENTS 7,729,529 B2 * 6/2010 Wu .......................... G03F 1/84
382/149
8,126,255 B2 2/2012 Bhaskar et al.
(Continued)

OTHER PUBLICATIONS

International Search Report and Written Opinion for PCT/US2021/030535 dated Aug. 18, 2021.

*Primary Examiner* — Roy M Punnoose
(74) *Attorney, Agent, or Firm* — Ann Marie Mewherter

(57) ABSTRACT

Systems and methods for detecting defects on a reticle are provided. One system includes computer subsystem(s) configured for performing at least one repeater defect detection step in front-end processing during an inspection process performed on a wafer having features printed in a lithography process using a reticle. The at least one repeater defect detection step performed in the front-end processing includes identifying any defects detected at corresponding locations in two or more test images by double detection and any defects detected by stacked defect detection as first repeater defect candidates. One or more additional repeater defect detections may be performed on the first repeater defect candidates to generate final repeater defect candidates and identify defects on the reticle from the final repeater defect candidates.

21 Claims, 7 Drawing Sheets

(52) U.S. Cl.
CPC ............. *G01N 2021/8864* (2013.01); *G06T 2207/30148* (2013.01)

(58) Field of Classification Search
USPC ........................................................ 382/149
See application file for complete search history.

(56) References Cited

U.S. PATENT DOCUMENTS

| | | | |
|---|---|---|---|
| 8,664,594 B1 | 4/2014 | Jiang et al. | |
| 8,692,204 B2 | 4/2014 | Kojima et al. | |
| 8,698,093 B1 | 4/2014 | Gubbens et al. | |
| 8,716,662 B1 | 5/2014 | MacDonald et al. | |
| 9,222,895 B2 | 12/2015 | Duffy et al. | |
| 9,766,186 B2 | 9/2017 | Chen et al. | |
| 9,766,187 B2 | 9/2017 | Chen et al. | |
| 10,127,652 B2 | 11/2018 | Gao et al. | |
| 10,365,232 B2 | 7/2019 | Suman et al. | |
| 10,395,358 B2 | 8/2019 | Brauer et al. | |
| 10,648,925 B2 | 5/2020 | Shifrin et al. | |
| 2002/0103607 A1 | 8/2002 | Crell | |
| 2005/0195414 A1 | 9/2005 | Rau et al. | |
| 2006/0147104 A1* | 7/2006 | Horie | G06T 7/001 382/144 |
| 2006/0291714 A1* | 12/2006 | Wu | G01N 21/95607 382/149 |
| 2009/0041332 A1 | 2/2009 | Bhaskar et al. | |
| 2010/0142800 A1* | 6/2010 | Tung-Sing Pak | G06T 7/001 382/149 |
| 2012/0023464 A1 | 1/2012 | Lin et al. | |
| 2016/0313647 A1 | 10/2016 | Halder et al. | |
| 2018/0130199 A1* | 5/2018 | Brauer | G01N 21/9501 |
| 2018/0342051 A1 | 11/2018 | Sezginer et al. | |
| 2020/0072763 A1 | 3/2020 | Suman et al. | |
| 2020/0244963 A1 | 7/2020 | Patwary et al. | |
| 2021/0090229 A1 | 3/2021 | Brauer et al. | |

* cited by examiner

PRINT CHECK REPEATER DEFECT DETECTION

BACKGROUND OF THE INVENTION

1. Field of the Invention

The present invention generally relates to systems and methods for repeater defect detection on print check wafers to detect defects on reticles such as extreme ultraviolet (EUV) single die and multi-die reticles.

2. Description of the Related Art

The following description and examples are not admitted to be prior art by virtue of their inclusion in this section.

Inspection processes are used at various steps during a semiconductor manufacturing process to detect defects on wafers to promote higher yield in the manufacturing process and thus higher profits. Some current inspection methods detect repeater defects on wafers to thereby detect defects on reticles. For example, if a defect is detected repeatedly ("a repeater defect") at multiple locations on a wafer corresponding to the same location on a reticle, the defects may be caused by the reticle itself. Therefore, repeater defects may be analyzed to determine if they are caused by reticle defects, rather than some other cause.

In general, repeater defect detection (RDD) is performed as a wafer post-processing (PP) operation. For example, the inspection tool may perform normal die-to-die defect detection (DD) in a multi-die reticle case, and after all wafer defects are reported, the RDD may be performed in a post-processing step rather than in a different computer component of the inspection tool. The repeater defects are defined in this filing as defects positioned at the same location (within a certain tolerance) in several reticles.

There are, however, several disadvantages to the currently used methods and systems for RDD. For example, in order to find weak repeater defects, a substantially hot defect detection needs to be performed. A majority of the detected events are not repeaters and are filtered by RDD. The problem is the tool has a limited capacity for defects stored in the lot result due to band-width (of the internal network of the inspection tool) and disk space. Location is a substantially strong filter that eliminates a majority of the events in the lot results, but for the weak repeaters, the inspection cannot be run hot enough to save all of the candidate defects.

Accordingly, it would be advantageous to develop systems and methods for detecting repeater defects on a wafer and thereby defects on a reticle that do not have one or more of the disadvantages described above.

SUMMARY OF THE INVENTION

The following description of various embodiments is not to be construed in any way as limiting the subject matter of the appended claims.

One embodiment relates to a system configured to detect defects on a reticle. The system includes an inspection subsystem configured to generate images for the wafer. A reticle is used to print features on the wafer in a lithography process. The system also includes one or more computer subsystems configured for detecting first defects in at least first and second test images included in the images. Detecting the first defects includes separately comparing each of the at least first and second test images to two different reference images corresponding to each of the at least first and second test images. The at least first and second test images correspond to different instances of the same area on the reticle printed on the wafer. The one or more computer subsystems are also configured for detecting stacked or averaged defects in at least the first test image by separately comparing a stacked test image generated for the first test image to two different stacked reference images corresponding to the stacked test image. In addition, the one or more computer subsystems are configured for performing a first repeater defect detection by identifying any of the first defects detected at corresponding locations in two or more of the at least first and second test images and any of the stacked defects as first repeater defect candidates. The one or more computer subsystems are further configured for performing at least one additional repeater defect detection on the first repeater defect candidates to thereby identify final repeater defect candidates and identifying defects on the reticle based on the final repeater defect candidates. The system may be further configured as described herein.

Another embodiment relates to a computer-implemented method for detecting defects on a reticle. The method includes acquiring images generated for a wafer by an inspection subsystem. A reticle is used to print features on the wafer in a lithography process. The method also includes the detecting first defects, detecting stacked defects, performing a first repeater defect detection, performing at least one additional repeater defect detection, and identifying defects steps described above, which are performed by one or more computer subsystems coupled to the inspection subsystem.

Each of the steps of the method may be further performed as described herein. The method may include any other step(s) of any other method(s) described herein. The method may be performed by any of the systems described herein.

Another embodiment relates to a non-transitory computer-readable medium storing program instructions executable on a computer system for performing a computer-implemented method for detecting defects on a reticle. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

BRIEF DESCRIPTION OF THE DRAWINGS

Further advantages of the present invention will become apparent to those skilled in the art with the benefit of the following detailed description of the preferred embodiments and upon reference to the accompanying drawings in which.

Figure 1:
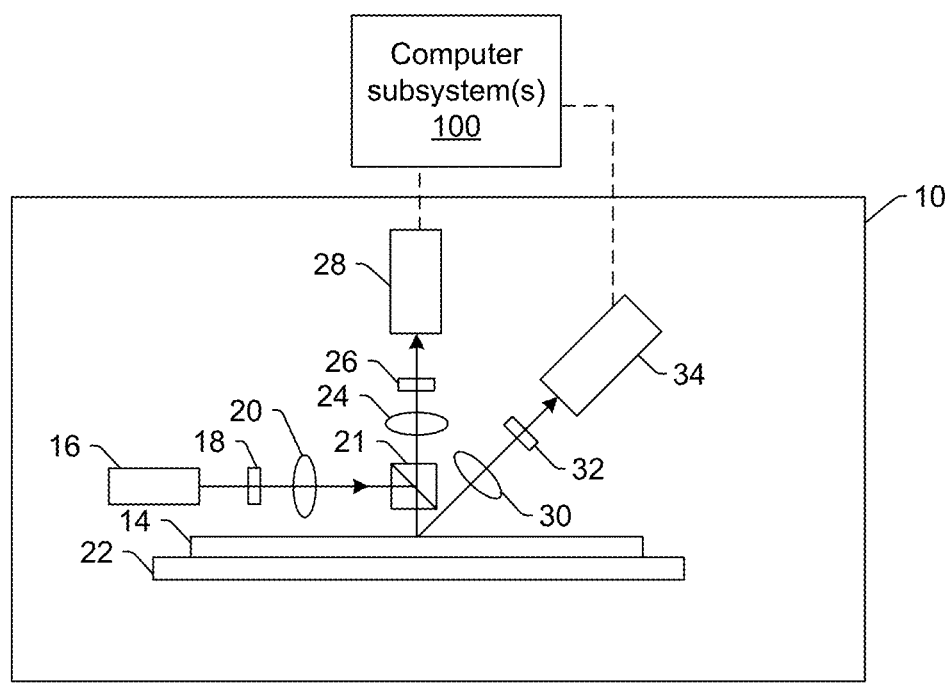
FIGS. 1 and 2 are schematic diagrams illustrating side views of embodiments of a system configured as described herein.

While the invention is susceptible to various modifications and alternative forms, specific embodiments thereof are shown by way of example in the drawings and are herein described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

One embodiment relates to a system configured to detect defects on a reticle. The embodiments described herein provide new and improved methods and systems for wafer inspection methodology for repeater defect detection (RDD) to detect defects on a reticle. The terms "reticle" and "mask" are used interchangeably herein. The term "repeaters" is used interchangeably herein with the term "repeater defects."

Introduction of extreme ultraviolet (EUV) lithography created a new application for advanced wafer inspection tools such as tools that utilize broadband light such as that generated by a broadband plasma (BBP) light source: particle contamination monitoring for reticles. Actinic light mask inspectors are currently not widely available, so users are adopting a print check approach, i.e. inspecting printed wafers with optical wafer inspectors to find mask defects. High throughput of advanced wafer inspection tools allows high wafer and die area coverage to be converted into high repeating defect sensitivity. Advanced wafer inspection tools can detect both printable relatively low signal defects and relatively low printability defects (mask defects that do not print on every reticle).

Traditionally, repeater detection was performed as a post-processing step of defect inspection. The tool was detecting all (random and systematic) defects and repeater analysis was performed later based on defect coordinates. If defects were detected in multiple reticles (above a user-defined threshold), the defect was considered a repeater. Such an approach limits the sensitivity since the defect inspector cannot be used with relatively low detection thresholds: substantially high defect density generated by such inspection overwhelms the data pipelines. In this manner, previously used methods and systems for repeater detection do not allow substantially high defect density and high enough sensitivity. Estimations and experiments show that to maintain sensitivity, as required by EUV (substantially high resolution and substantially small defects), the inspector should be used substantially close to the noise floor, so the expected defect density is extremely high.

The approach used in the embodiments described herein moves a significant part of repeater detection into the front end of inspection to improve sensitivity of inspection to repeating defects. By moving repeater detection into the front end of inspection, the embodiments described herein can also achieve substantially high repeater sensitivity in the presence of substantially high random and systematic noise.

One embodiment of such a system is shown in FIG. 1. The system includes an inspection subsystem configured to generate images for the wafer. The inspection subsystems described herein may include at least an energy source and a detector. The energy source is configured to generate energy that is directed to a wafer. The detector is configured to detect energy from the wafer and to generate output (e.g., images) responsive to the detected energy.

In one embodiment, the energy directed to the wafer includes light, and the energy detected from the wafer includes light. For example, in the embodiment of the system shown in FIG. 1, inspection subsystem 10 includes an illumination subsystem configured to direct light to specimen 14. The illumination subsystem includes at least one light source. For example, as shown in FIG. 1, the illumination subsystem includes light source 16. In one embodiment, the illumination subsystem is configured to direct the light to the wafer at one or more angles of incidence, which may include one or more oblique angles and/or one or more normal angles. For example, as shown in FIG. 1, light from light source 16 is directed through optical element 18 and then lens 20 to beam splitter 21, which directs the light to wafer 14 at a normal angle of incidence. The angle of incidence may include any suitable angle of incidence, which may vary depending on, for instance, characteristics of the wafer and the defects to be detected on the wafer.

The illumination subsystem may be configured to direct the light to the wafer at different angles of incidence at different times. For example, the inspection subsystem may be configured to alter one or more characteristics of one or more elements of the illumination subsystem such that the light can be directed to the wafer at an angle of incidence that is different than that shown in FIG. 1. In one such example, the inspection subsystem may be configured to move light source 16, optical element 18, and lens 20 such that the light is directed to the wafer at a different angle of incidence.

In some instances, the inspection subsystem may be configured to direct light to the wafer at more than one angle of incidence at the same time. For example, the illumination subsystem may include more than one illumination channel, one of the illumination channels may include light source 16, optical element 18, and lens 20 as shown in FIG. 1 and another of the illumination channels (not shown) may include similar elements, which may be configured differently or the same, or may include at least a light source and possibly one or more other components such as those described further herein. If such light is directed to the wafer at the same time as the other light, one or more characteristics (e.g., wavelength, polarization, etc.) of the light directed to the wafer at different angles of incidence may be different such that light resulting from illumination of the wafer at the different angles of incidence can be discriminated from each other at the detector(s).

In another instance, the illumination subsystem may include only one light source (e.g., source 16 shown in FIG. 1) and light from the light source may be separated into different optical paths (e.g., based on wavelength, polarization, etc.) by one or more optical elements (not shown) of the illumination subsystem. Light in each of the different optical paths may then be directed to the wafer. Multiple illumination channels may be configured to direct light to the wafer at the same time or at different times (e.g., when different illumination channels are used to sequentially illuminate the wafer). In another instance, the same illumination channel may be configured to direct light to the wafer with different characteristics at different times. For example, in some instances, optical element 18 may be configured as a spectral filter and the properties of the spectral filter can be changed in a variety of different ways (e.g., by swapping out the spectral filter) such that different wavelengths of light can be directed to the wafer at different times. The illumination subsystem may have any other suitable configuration known in the art for directing the light having different or the same characteristics to the wafer at different or the same angles of incidence sequentially or simultaneously.

In one embodiment, light source 16 may include a broadband plasma (BBP) light source. In this manner, the light generated by the light source and directed to the wafer may include broadband light. However, the light source may include any other suitable light source such as a laser. The laser may include any suitable laser known in the art and may be configured to generate light at any suitable wavelength or wavelengths known in the art. In addition, the laser may be configured to generate light that is monochromatic or nearly-monochromatic. In this manner, the laser may be a narrowband laser. The light source may also include a polychromatic light source that generates light at multiple discrete wavelengths or wavebands.

Light from optical element 18 may be focused to beam splitter 21 by lens 20. Although lens 20 is shown in FIG. 1 as a single refractive optical element, in practice, lens 20 may include a number of refractive and/or reflective optical elements that in combination focus the light from the optical element to the wafer. The illumination subsystem shown in FIG. 1 and described herein may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, the system may be configured to alter one or more of the elements of the illumination subsystem based on the type of illumination to be used for inspection.

The inspection subsystem may also include a scanning subsystem configured to cause the light to be scanned over the wafer. For example, the inspection subsystem may include stage 22 on which wafer 14 is disposed during inspection. The scanning subsystem may include any suitable mechanical and/or robotic assembly (that includes stage 22) that can be configured to move the wafer such that the light can be scanned over the wafer. In addition, or alternatively, the inspection subsystem may be configured such that one or more optical elements of the inspection subsystem perform some scanning of the light over the wafer. The light may be scanned over the wafer in any suitable fashion.

The inspection subsystem further includes one or more detection channels. At least one of the one or more detection channels includes a detector configured to detect light from the wafer due to illumination of the specimen by the inspection subsystem and to generate output responsive to the detected light. For example, the inspection subsystem shown in FIG. 1 includes two detection channels, one formed by collector 24, element 26, and detector 28 and another formed by collector 30, element 32, and detector 34. As shown in FIG. 1, the two detection channels are configured to collect and detect light at different angles of collection. In some instances, one detection channel is configured to detect specularly reflected light, and the other detection channel is configured to detect light that is not specularly reflected (e.g., scattered, diffracted, etc.) from the specimen. However, two or more of the detection channels may be configured to detect the same type of light from the wafer (e.g., specularly reflected light). Although FIG. 1 shows an embodiment of the inspection subsystem that includes two detection channels, the inspection subsystem may include a different number of detection channels (e.g., only one detection channel or two or more detection channels). Although each of the collectors are shown in FIG. 1 as single refractive optical elements, each of the collectors may include one or more refractive optical element(s) and/or one or more reflective optical element(s).

The one or more detection channels may include any suitable detectors known in the art such as photo-multiplier tubes (PMTs), charge coupled devices (CCDs), and time delay integration (TDI) cameras. The detectors may also include non-imaging detectors or imaging detectors. If the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels of the inspection subsystem may be signals or data, but not image signals or image data. In such instances, a computer subsystem described further herein may be configured to generate images of the wafer from the non-imaging output of the detectors. In other instances, the detectors may be configured as imaging detectors that are configured to generate image signals or image data. Therefore, the system may be configured to generate the images described herein in a number of ways.

It is noted that FIG. 1 is provided herein to generally illustrate a configuration of an inspection subsystem that may be included in the system embodiments described herein. Obviously, the inspection subsystem configuration described herein may be altered to optimize the performance of the system as is normally performed when designing a commercial inspection system. In addition, the systems described herein may be implemented using an existing inspection system (e.g., by adding functionality described herein to an existing inspection system) such as the 29xx/39xx series of tools that are commercially available from KLA Corp., Milpitas, Calif. For some such systems, the methods described herein may be provided as optional functionality of the system (e.g., in addition to other functionality of the system). Alternatively, the system described herein may be designed "from scratch" to provide a completely new system.

Computer subsystem(s) 100 of the system may be coupled to the detectors of the inspection subsystem in any suitable manner (e.g., via one or more transmission media, which may include "wired" and/or "wireless" transmission media) such that the computer subsystem(s) can receive the output generated by the detectors during scanning of the wafer. Computer subsystem(s) 100 may be configured to perform a number of functions using the output of the detectors as described herein and any other functions described further herein. Computer subsystem(s) 100 may be further configured as described herein.

Computer subsystem(s) 100 (as well as other computer subsystems described herein) may also be referred to herein as computer system(s). Each of the computer subsystem(s) or system(s) described herein may take various forms, including a personal computer system, image computer, mainframe computer system, workstation, network appliance, Internet appliance, or other device, adapted according to the various embodiments described herein. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and SW, either as a standalone or a networked tool.

If the system includes more than one computer subsystem, the computer subsystems may be coupled to each other such that images, data, information, instructions, etc. can be sent between the various computer subsystems. For example, different computer subsystems may be coupled to each other by any suitable transmission media, which may include any suitable wired and/or wireless transmission media known in the art. Two or more of the computer subsystems may also be effectively coupled by a shared computer-readable and -writable storage medium (not shown).

Although the inspection subsystem is described above as being an optical or light-based inspection subsystem, the inspection subsystem may be an electron beam-based inspection subsystem. For example, in one embodiment, the energy directed to the wafer includes electrons, and the energy detected from the wafer includes electrons. In this manner, the energy source may be an electron beam source. In one such embodiment shown in FIG. 2, the inspection subsystem includes electron column 122, which is coupled to computer subsystem(s) 200.

Figure 2:
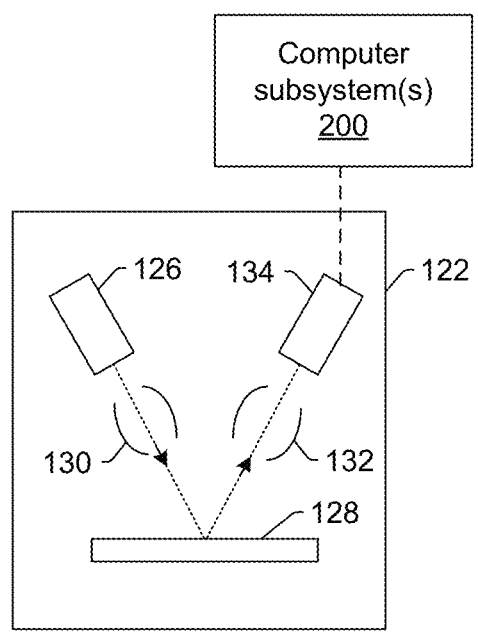

As also shown in FIG. 2, the electron column includes electron beam source 126 configured to generate electrons that are focused to specimen 128 by one or more elements 130. The electron beam source may include, for example, a cathode source or emitter tip, and one or more elements 130 may include, for example, a gun lens, an anode, a beam limiting aperture, a gate valve, a beam current selection aperture, an objective lens, and a scanning subsystem, all of which may include any such suitable elements known in the art.

Electrons returned from the specimen (e.g., secondary electrons) may be focused by one or more elements 132 to detector 134. One or more elements 132 may include, for example, a scanning subsystem, which may be the same scanning subsystem included in element(s) 130.

The electron column may include any other suitable elements known in the art. In addition, the electron column may be further configured as described in U.S. Pat. No. 8,664,594 issued Apr. 4, 2014 to Jiang et al., U.S. Pat. No. 8,692,204 issued Apr. 8, 2014 to Kojima et al., U.S. Pat. No. 8,698,093 issued Apr. 15, 2014 to Gubbens et al., and U.S. Pat. No. 8,716,662 issued May 6, 2014 to MacDonald et al., which are incorporated by reference as if fully set forth herein.

Although the electron column is shown in FIG. 2 as being configured such that the electrons are directed to the wafer at an oblique angle of incidence and are scattered from the wafer at another oblique angle, the electron beam may be directed to and scattered from the wafer at any suitable angles. In addition, the electron beam-based subsystem may be configured to use multiple modes to generate images of the wafer (e.g., with different illumination angles, collection angles, etc.). The multiple modes of the electron beam-based subsystem may be different in any image generation parameters of the subsystem.

Computer subsystem(s) 200 may be coupled to detector 134 as described above. The detector may detect electrons returned from the surface of the wafer thereby forming electron beam images of the wafer. The electron beam images may include any suitable electron beam images. Computer subsystem(s) 200 may be configured to perform any of the functions described herein using the output of the detector and/or the electron beam images. Computer subsystem(s) 200 may be configured to perform any additional step(s) described herein. A system that includes the inspection subsystem shown in FIG. 2 may be further configured as described herein.

It is noted that FIG. 2 is provided herein to generally illustrate a configuration of an electron beam-based inspection subsystem that may be included in the embodiments described herein. As with the optical inspection subsystem described above, the electron beam-based inspection subsystem configuration described herein may be altered to optimize the performance of the inspection subsystem as is normally performed when designing a commercial inspection system. In addition, the systems described herein may be implemented using an existing inspection system (e.g., by adding functionality described herein to an existing inspection system). For some such systems, the methods described herein may be provided as optional functionality of the system (e.g., in addition to other functionality of the system). Alternatively, the system described herein may be designed "from scratch" to provide a completely new system.

Although the inspection subsystem is described above as being a light- or electron beam-based inspection subsystem, the inspection subsystem may be an ion beam-based inspection subsystem. Such an inspection subsystem may be configured as shown in FIG. 2 except that the electron beam source may be replaced with any suitable ion beam source known in the art. In addition, the inspection subsystem may be any other suitable ion beam-based subsystem such as those included in commercially available focused ion beam (FIB) systems, helium ion microscopy (HIM) systems, and secondary ion mass spectroscopy (SIMS) systems.

As noted above, the inspection subsystems may be configured for directing energy (e.g., light, electrons) to and/or scanning energy over a physical version of the specimen thereby generating actual images for the physical version of the specimen. In this manner, the inspection subsystems may be configured as "actual" imaging systems, rather than "virtual" systems. A storage medium (not shown) and computer subsystem(s) 100 shown in FIG. 1 may be configured as a "virtual" system. Systems and methods configured as "virtual" inspection systems are described in commonly assigned U.S. Pat. No. 8,126,255 issued on Feb. 28, 2012 to Bhaskar et al. and U.S. Pat. No. 9,222,895 issued on Dec. 29, 2015 to Duffy et al., both of which are incorporated by reference as if fully set forth herein. The embodiments described herein may be further configured as described in these patents.

As further noted above, the inspection subsystem may be configured to have multiple modes. In general, a "mode" is defined by the values of parameters of the inspection subsystem used to generate output for the specimen. Therefore, modes that are different may be different in the values for at least one of the optical or electron beam parameters of the inspection subsystem (other than position on the specimen at which the output or images are generated). For example, for a light-based inspection subsystem, different modes may use different wavelengths of light. The modes may be different in the wavelengths of light directed to the specimen as described further herein (e.g., by using different light sources, different spectral filters, etc.) for different modes. In another embodiment, different modes may use different illumination channels. For example, as noted above, the inspection subsystem may include more than one illumination channel. As such, different illumination channels may be used for different modes.

The multiple modes may also be different in illumination and/or collection/detection. For example, as described further above, the inspection subsystem may include multiple detectors. Therefore, one of the detectors may be used for one mode and another of the detectors may be used for another mode. Furthermore, the modes may be different from each other in more than one way described herein (e.g., different modes may have one or more different illumination parameters and one or more different detection parameters). The inspection subsystem may be configured to scan the specimen with the different modes in the same scan or different scans, e.g., depending on the capability of using multiple modes to scan the specimen at the same time.

A reticle is used to print features on the wafer in a lithography process. The lithography process may include any suitable lithography process. In general, a lithography process uses some form of energy (e.g., light, electrons, etc.) to transfer a pattern formed on a reticle to a material on a wafer. The material on the wafer may be some form of resist, one or more properties of which change after exposure to the energy used in the lithography process. In this manner, a pattern of energy (light, electrons, etc.) can be directed from or through a reticle to a resist on a wafer to thereby transfer the pattern from the reticle to the resist. One or more additional steps may be performed on the resist (e.g., post exposure bake, development, etc.) to complete the pattern transfer process. Therefore, as can be clearly seen from this general description of lithography processes, defects that are present on a reticle can be transferred to a wafer in the lithography process, which is obviously disadvantageous. As further described herein, sometimes it is not possible to inspect a reticle directly, as in a reticle inspection process. In such instances, the reticle is printed on a wafer, the wafer is inspected for defects, and those wafer defects are used to determine if the defects are caused by the reticle. Such determinations may be performed as described further herein.

In one embodiment, the reticle is a single die reticle (SDR). In another embodiment, the reticle is a multiple die reticle (MDR). In a further embodiment, the reticle is configured for use at an extreme ultraviolet (EUV) wavelength. For example, the embodiments described herein can be used for both SDR inspections, in which a reticle mask contains only one die so a clean reference image does not exist on a wafer since every mask defect is printed in every die, and MDR, in which a mask contains several identical dies so the reference image may be constructed from the dies available on the inspected wafer.

"Print check" is defined herein as a type of mask inspection that involves printing the mask on a wafer, inspecting the wafer, and identifying defects on the mask based on the wafer inspection results. Print check may be used to identify reticle repeaters for EUV mask monitoring, which may be performed to routinely or regularly check EUV masks released to production for possible contamination. Print check can be used for both SDR and MDR. Print check may include train and detection steps. Print check train may include multiple steps described further herein such as saving multiple aligned reference dies including a master die for repeater detection for SDR, saving one master die to achieve substantially accurate die relative location accuracy, and identifying alignment targets from the master die for runtime alignment. For SDR print check inspection, references saved during training are compared with runtime inspection images to find reticle repeaters. For MDR print check inspection, die-to-die comparisons from the same scan may be used to find reticle repeaters. For array region print check, repeater in array (RIA) based on cell-to-cell comparison may be used to find reticle repeaters.

The one or more computer subsystems are configured for detecting first defects in at least first and second test images included in the images generated for the wafer by the inspection subsystem. The term "first defects" as used herein is merely used to differentiate defects that are detected by double detection performed separately for individual test images from defects detected in other manners (e.g., via image stacking described further herein).

The at least first and second test images correspond to different instances of the same area on the reticle printed on the wafer. What constitutes different instances of the same area of a reticle printed on a wafer may vary depending on whether the reticle is an SDR or an MDR. For example, for an SDR, the different instances of the same area on the reticle printed on the wafer may be corresponding areas in different dies separately printed on the wafer using the reticle. In the case of an MDR, the different instances of the same area on the reticle printed on the wafer may be corresponding areas in different instances of the reticle printed on the wafer and/or corresponding areas in different dies printed in a single instance of the reticle printed on the wafer.

In any case, the double detection performed separately for different test images is preferably performed for at least two test images so that defect information sufficient for the first RDD step described herein is generated. But the double detection performed to detect the first defects is not so limited. For example, such double detection may preferably be performed for more than two test images and perhaps many more than two test images, e.g., test images for each corresponding area in each instance of a reticle printed in one die row on a wafer or multiple die rows on the wafer.

Figure 3:
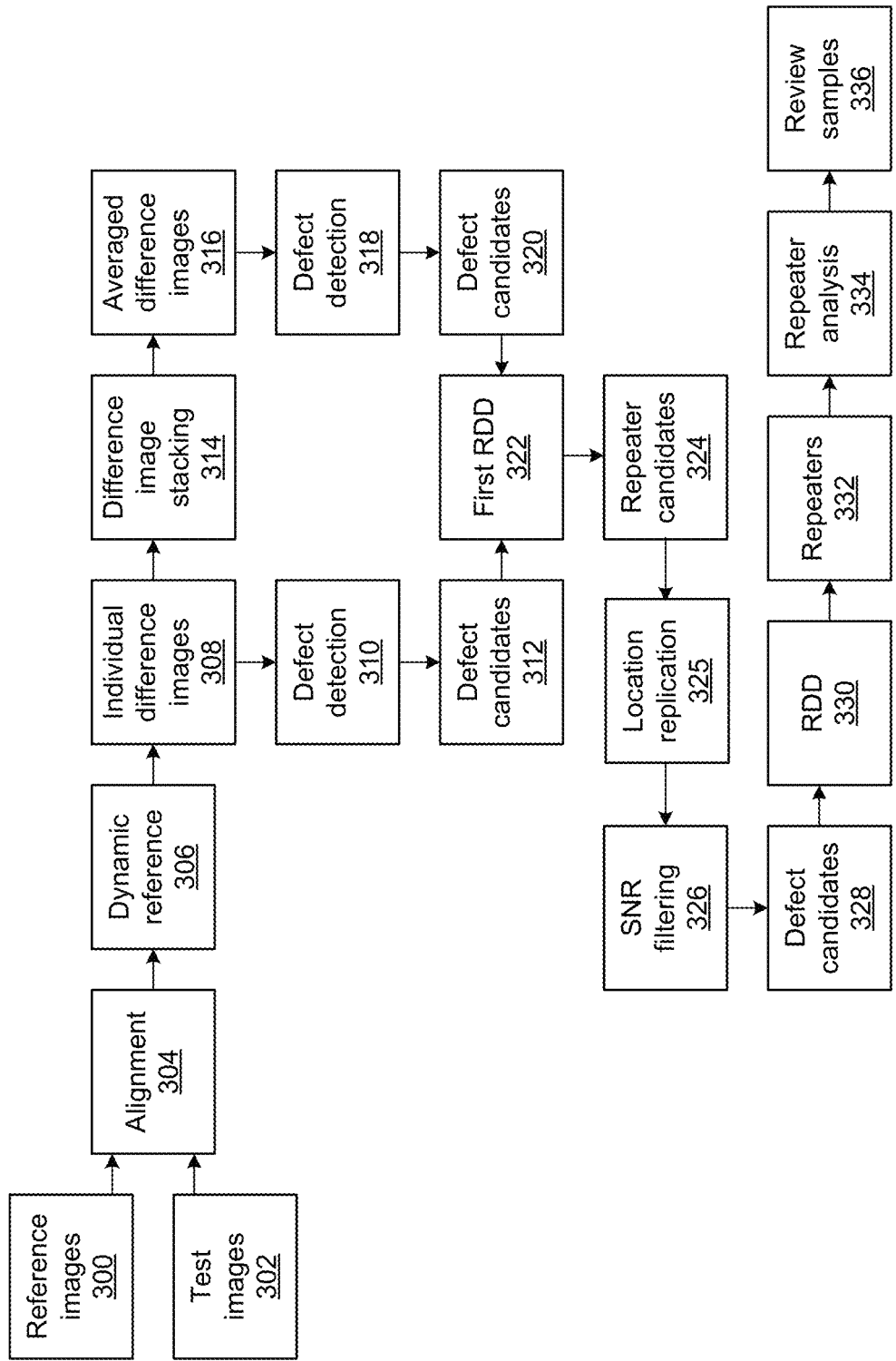
FIG. 3 is a flow chart illustrating one embodiment of steps that may be performed by the embodiments described herein to detect defects on a reticle.

Detecting the first defects includes separately comparing each of the at least first and second test images to two different reference images corresponding to each of the at least first and second test images. For example, FIG. 3 shows steps that may be performed for SDR and MDR inspection. As shown in FIG. 3, reference images 300 and test images 302 may be input to alignment step 304, which may include any of the alignment methods described herein (e.g., aligning the test and reference images to a common reference such as a master reference die).

The test images that are input to the alignment step may be generated as described herein by an inspection subsystem. The reference images that are input to the alignment step may also be generated by imaging the wafer on which the first defects are being detected or by imaging a training wafer on which features have also been printed using the reticle.

Before or after alignment, the one or more computer subsystems may generate a reference image for one or more of the test images, which may be performed in a variety of ways described herein. For example, after alignment, the one or more computer subsystems may generate dynamic reference 306 for one or more of the test images, which may be performed as described further herein.

Detecting the first defects as described herein is performed to detect the first defects in individual test images via double detection using two different reference images. In this manner, one individual test image may be compared to a first reference image and then compared to a second reference image. The comparisons may involve subtracting the first reference image from the test image and subtracting the second reference image from the test image (e.g., Test Image–First Reference Image, Test Image–Second Reference Image) thereby generating individual difference images 308, two for each test image. Defect detection 310 may then be performed on the individual difference images, which may include applying a defect detection threshold to the pixels in the individual difference images, identifying pixels having signals above the threshold as defective, and conversely not identifying pixels having signals below the threshold as defective. Defect detection 310 may also include determining that any pixels at corresponding locations in both difference images generated for a test image that have been detected as defective are defect candidates 312. In this manner, a pixel that is detected as defective in one of the difference images generated for a test image but not the other difference image also generated for the test image will not be deemed a defect candidate since it was only singly detected. In other words, any pixels that are detected in both difference images as defects are doubly detected and thereby identified as defect candidates 312.

In one embodiment, the inspection subsystem is configured to generate images for a pre-selected master die on the wafer or a training wafer, and the one or more computer subsystems are configured for performing runtime alignment of at least the different reference images to the images generated for the pre-selected master die prior to detecting the first defects and detecting the stacked defects as described further herein. For example, during both SDR and MDR inspection, all dies may be aligned to the master die first. In general, for SDR inspection, the images for the pre-selected master die may be generated using a training wafer (i.e., not the wafer being inspected or the runtime wafer). For MDR inspection, the images for the pre-selected master die may be generated using a training wafer or the wafer that will be inspected. These steps may be performed as described further herein. Generating the images for the pre-selected master die on the wafer or a training wafer may be performed as described further herein, e.g., by the inspection subsystem scanning the pre-selected master die on the wafer. The runtime alignment may be performed using any suitable alignment method or algorithm known in the art. In addition to separately aligning one or more reference images to the master die image, the one or more computer subsystems may also separately align one or more test images to the master die image thereby effectively aligning the test and reference images to a common reference and hence each other. However, in other instances, the one or more computer subsystems may align only the reference image(s) to the master die image and then align the test images to the reference images. The terms "master die" and "master reference die" are used interchangeably herein.

In any of the embodiments described herein, images for multiple reference dies may be generated during training or inspection and stored for use in one or more of the defect detection steps described herein. The multiple reference dies that are stored may include any of the reference images for any of the reference dies described herein and may be stored in any manner described herein, e.g., in a recipe used to perform runtime inspection.

In another embodiment, the inspection subsystem is configured to generate images for pre-selected reference dies on the wafer or a training wafer, and the one or more computer subsystems are configured for selecting the two different reference images for the separately comparing to said each of the at least first and second test images from the images generated for the pre-selected reference dies. Generating the images for the pre-selected reference dies on the wafer or a training wafer may be performed as described further herein, e.g., by the inspection subsystem scanning the pre-selected reference dies on the wafer or a training wafer. The pre-selected reference dies may be on a training wafer for SDR and the wafer for MDR as described further herein. Selecting the two different reference images as described above may be a kind of dynamic reference generation. For example, as described further herein, for SDR, reference images may be generated for pre-selected reference dies on a training wafer. When detecting the first defects then, for any one test image, the reference images that are used may be selected from all of the available pre-selected reference die images. Selecting the pre-selected reference die images may be performed based on location of the test die on the wafer, e.g., such that the pre-selected reference die images were generated in dies on the training wafer that are relatively near the test die on the wafer. In this manner, reference dies that may have similar noise characteristics to the test image from which they will be subtracted can be selected for detecting the first defects.

In an additional embodiment, the inspection subsystem is configured to generate images for pre-selected reference dies on a training wafer, and the one or more computer subsystems are configured for storing the images for the pre-selected reference dies and dynamically generating the two different reference images for the separately comparing to each of the at least first and second test images from the images generated for the pre-selected reference dies. For example, the reference images used in the embodiments described herein may be computed references (CRs), which reduce systematic noise by creating synthetic reference images optimized for every die. Double detection performed using CR images will advantageously suppress randomly located and false defects and artifacts created by CR thereby allowing more aggressive noise suppression. The pre-selected reference dies that are used for dynamically generating the two different reference images for separate comparisons to any one test image may be selected by the one or more computer subsystems as described above. Generating the images for the pre-selected reference dies on the training wafer may be performed as described further herein, e.g., by the inspection subsystem scanning the pre-selected reference dies on the training wafer. The one or more computer subsystems may store the images for the pre-selected reference dies as described further herein.

For the SDR case, the reference images may be saved in the tool database (as part of the inspection recipe) similar to how other reference images may be stored for defect detection. The major difference is, for print check, we save multiple die images. The embodiments may preferably use several die rows for setup to cover a bigger variety of the images. This allows CR to construct reference images that are closer to the test ones thus producing lower noise difference images. Similar to other stored reference image defect detection methods, it is preferable to create reference images when the reticle is guaranteed to be clean, e.g., at the time of or shortly after reticle cleaning.

Figure 4:
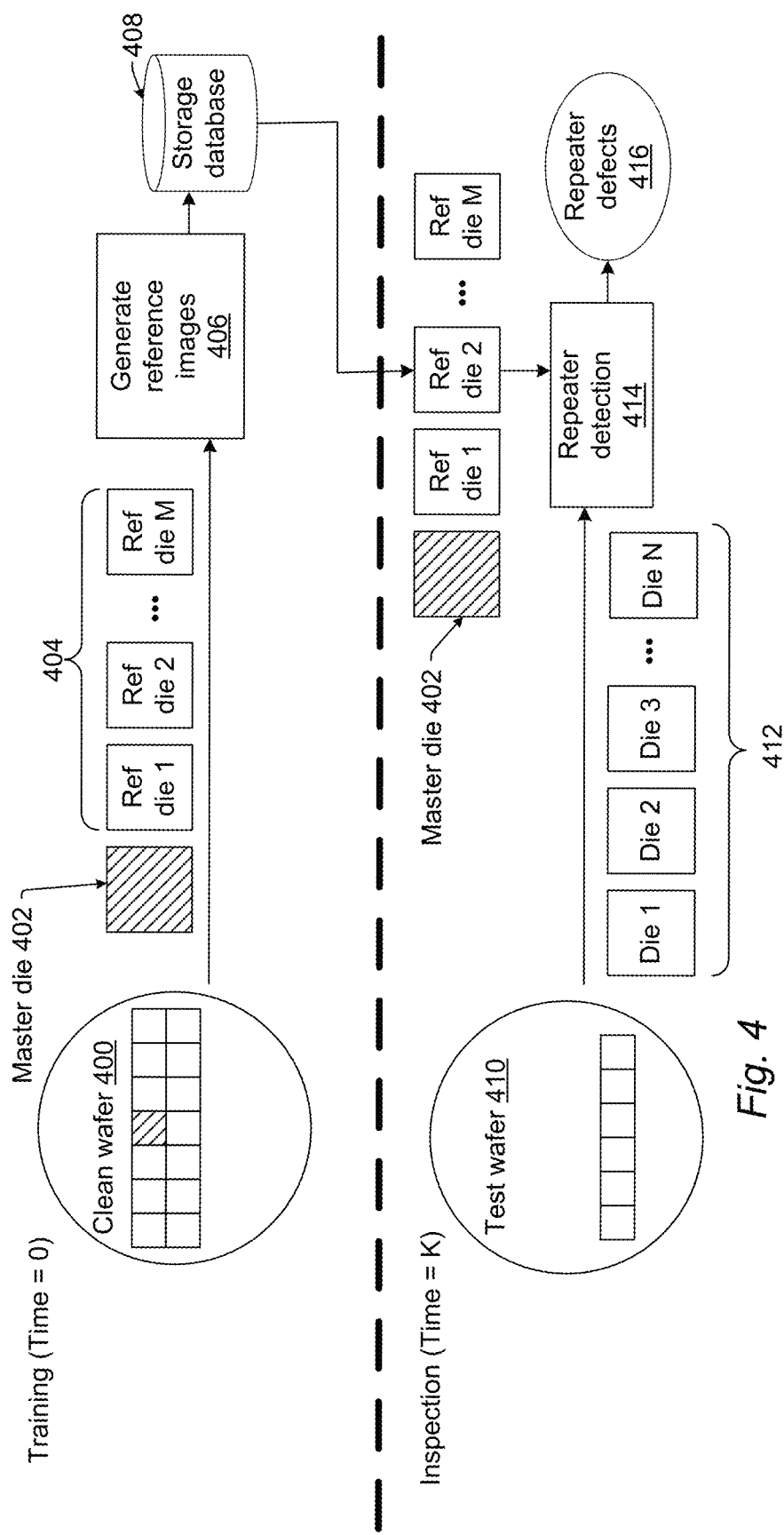
FIG. 4 is a flow chart illustrating one embodiment of steps that may be performed by the embodiments described herein during setup and runtime for detecting defects on a single die reticle (SDR)

In this manner, SDR training may include steps performed using a training, reference, or "golden" wafer. FIG. 4 shows various steps that may be performed for SDR training and inspection. The steps shown above the dashed line in FIG. 4 are steps that may be performed during training (Time=0) using clean wafer 400. One of the dies on the training wafer may be selected as the master reference die, and any number of dies from anywhere on the wafer can be selected as reference dies. For example, as shown in FIG. 4, master die 402 may be selected on clean wafer 400 and shown in its location on the wafer as the die with the patterned fill. Any or all of the remaining dies on the wafer may be used as reference dies 404 shown in FIG. 4 as Ref die 1, Ref die 2, . . . Ref die M and shown in their locations on the wafer as the dies with no fill patterns.

Although FIG. 4 shows a training wafer having 2 die rows with 6 dies in each row, the training wafer may include any number of dies in any number of rows and columns. In addition, although FIG. 4 shows that each of the dies printed on the wafer are selected as either a master die or a reference die, that is not necessary. In other words, not all of the dies may be used as a master die or a reference die.

Figure 5:
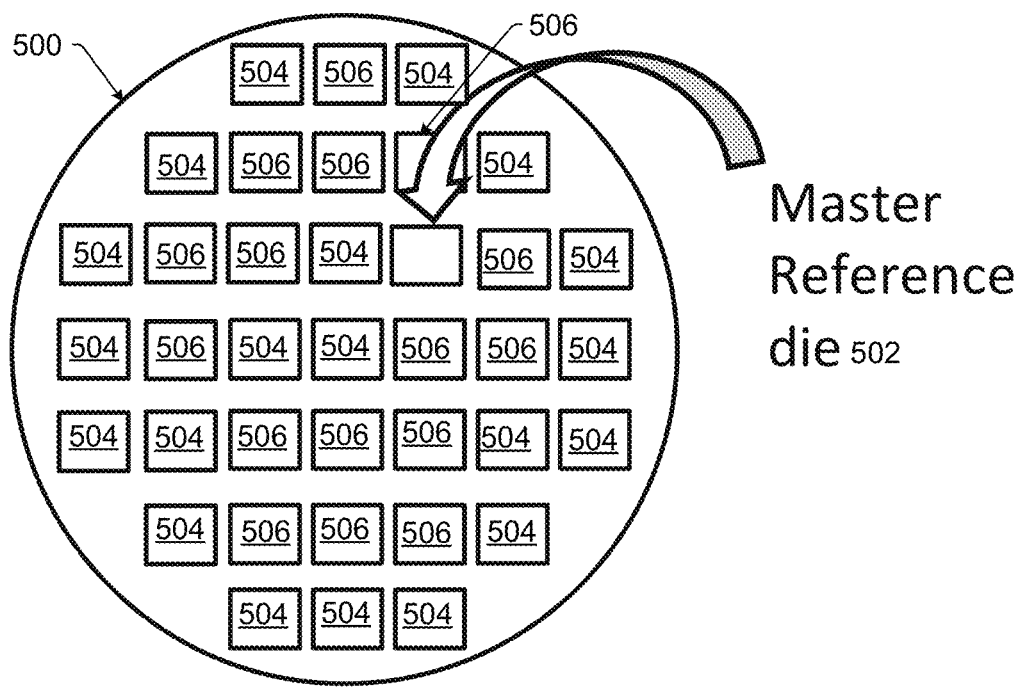
FIG. 5 is a schematic diagram illustrating a plan view of a wafer printed with a SDR (single die reticle) and dies selected for different purposes in the embodiments described herein.

In some instances, it may be advantageous to generate reference die images from dies formed at many and/or at the most diverse locations on the wafer as possible. For example, FIG. 5 illustrates dies formed on wafer 500, some of which have been selected for use in the training phase for SDR inspection. In particular, master reference die 502 is shown as a die selected somewhat near the center of the wafer, e.g., nearer the center of the wafer than the edge of the wafer or at least spaced from the edge of the wafer. In general, the master die may be selected at any location on the wafer, which may be determined in a variety of different ways such as where a process that transfers the features from the reticle to the wafer is known to perform relatively well. In FIG. 5, dies 504 may be selected for use as reference dies, and dies 506 may not be selected for use as reference dies. As shown in FIG. 5, dies 504 include dies located around the edge of the wafer as well as the center of the wafer. In this manner, the reference dies may represent a subset of dies on the wafer and may include dies that may be as different as possible from each other, e.g., due to process variations across the wafer.

Figure 6:
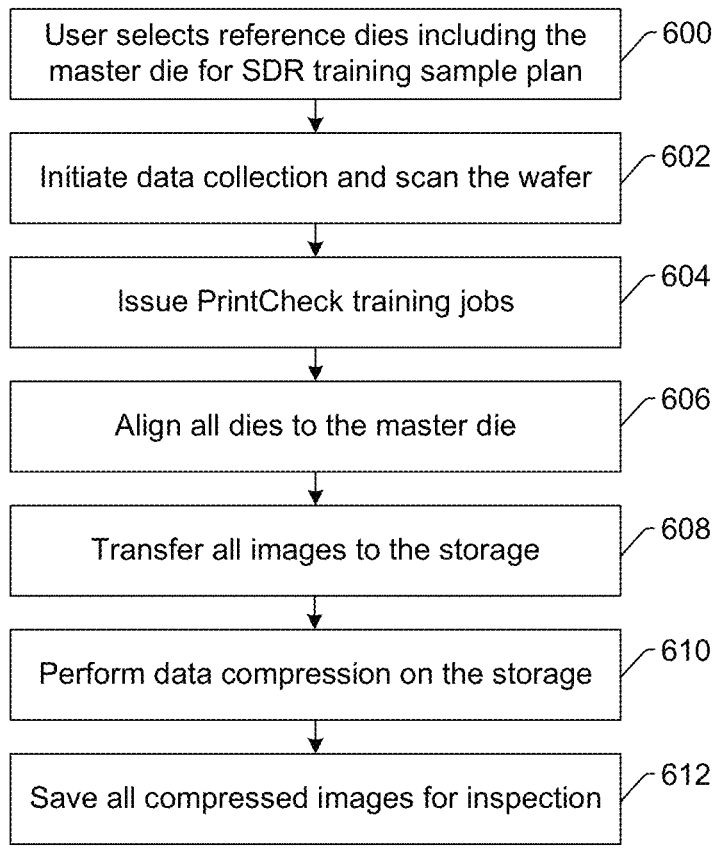
FIG. 6-7 are flow charts illustrating embodiments of steps that may be performed during training for SDR inspection performed for different die rows on a wafer.

The one or more computer subsystems described herein may select the master die and reference dies on the wafer. However, as shown in FIG. 6, which shows steps that may be performed during SDR training on a first die row, a user may select reference dies including the master die for SDR training sample plan, as shown in step 600. In either case, the one or more computer subsystems or the user may select the master die and the reference dies based on information such as that described above or any other information about the reticle, the wafer, and the process used to print features on the reticle onto the wafer. The embodiments described herein may include several elements that facilitate the selection of the reference dies and the master die by the user such as a user interface (UI), display device, user input device, etc. Alternatively, the user may use another one or more computer subsystems to select the reference dies and the master die, and the one or more computer subsystems may acquire information for the user-selected reference and master dies from the other one or more computer subsystems or a storage medium in which the information has been stored.

The inspection subsystem and the computer subsystem(s) may perform generate reference images step 406 shown in FIG. 4. In this step, the die row including the master die may be scanned first. For example, as shown in step 602 of FIG. 6, the one or more computer subsystems may initiate data collection and the inspection subsystem may scan the wafer. As shown in step 604 of FIG. 6, the one or more computer subsystems may issue print check training jobs. On the first scanned die row, the selected reference dies are aligned to the master die within the same scan swath before saving to storage database 408 of FIG. 4. For example, as shown in step 606 of FIG. 6, the one or more computer subsystems may align all dies to the master die. The one or more computer subsystems may then transfer all images to the storage, as shown in step 608.

In another embodiment, the alignment step can be skipped during SDR training. In this case, the reference alignment should be performed during run-time inspection before defect detection.

Alignment targets may be selected from the master die with target locations saved in the storage database. Alignment targets and the master die may be used for cross-swath image-to-image alignment in both training and inspection.

Any of the master and reference die images generated in the SDR training phase may be compressed for storage in the storage database. For example, as shown in step 610, the one or more computer subsystems may be configured to perform data compression on the storage, which may include any suitable data compression known in the art. As further shown in step 612, the one or more computer subsystems may save all compressed images for inspection. In one such embodiment, to reduce data storage space, the master reference die and the difference dies between the rest of the reference dies and the master reference die can be compressed before being saved to the database instead of all reference dies and the master die. In addition, to better extract important information and reduce storage space, higher order information may be extracted from all non-master reference dies.

Figure 7:
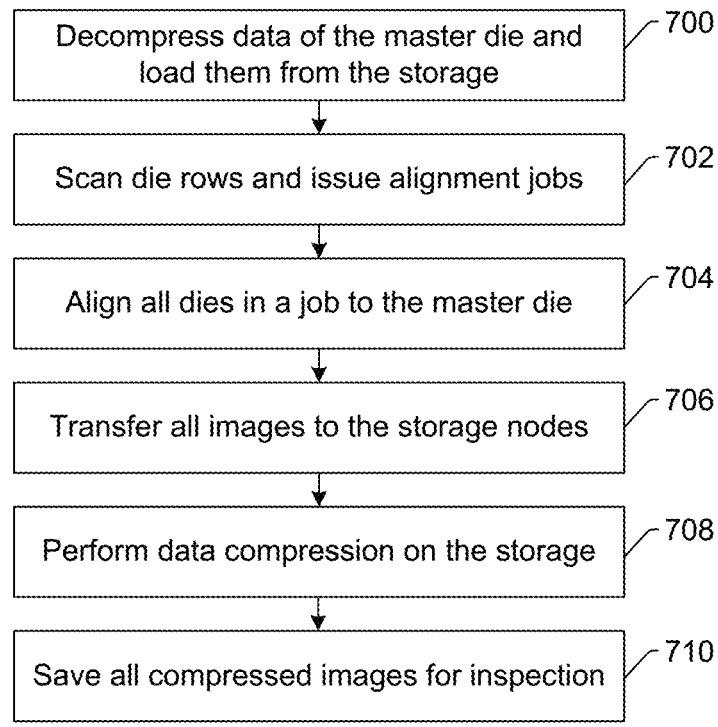

On the following die row, the selected reference die images may be aligned to the master reference die image across swaths or at corresponding swaths before the reference die images are saved to the storage database. On the following die rows, the corresponding swath of the master reference die image from the first scanned die row may be retrieved from the storage database for alignment. For example, FIG. 7 shows steps that may be performed during SDR training on the following die rows. As shown in step 700, the one or more computer subsystems may decompress data of the master die image and load them from the storage. Decompression and loading of the master die image may be performed in any suitable manner known in the art. As shown in step 702, the inspection subsystem may scan die rows and issue alignment jobs, which may be performed as described further herein. As shown in step 704, the one or more computer subsystems may align all dies in a job to the master die. The alignment may be performed using the alignment targets selected in the master die image and may be performed using any suitable alignment method or algorithm known in the art. The one or more computer subsystems may then transfer all images to the storage nodes, as shown in step 706. In some instances, the one or more computer subsystems may perform data compression on the storage, as shown in step 708, and save all compressed images for inspection, as shown in step 710. In this manner, the flow of the first scanned die row that includes the master die is different from other die rows scanned in the training phase.

SDR inspection runtime may then be performed as described further herein. FIG. 4 shows SDR inspection at a very high level. In particular, during inspection (Time=K), the steps shown below the dashed line in FIG. 4 may be performed and may include scanning test wafer 410 to thereby generate images of test dies 412, which may include Die 1, Die 2, Die 3, . . . Die N. The one or more computer subsystems may retrieve images generated during training from storage database 408, which may include images for master die 402 and any of the reference dies, e.g., Ref die 1, Ref die 2, . . . Ref die M, which may be used during runtime for steps such as alignment, reference image generation or selection, defect detection, etc., which may be performed as described further herein. For example, during runtime, the test images may be aligned to the master die image as described herein thereby effectively aligning the test images to the reference images previously aligned to the master die image. The test images generated for the test wafer and the master die and reference images retrieved from the storage database may then be used for the defect detection and RDD steps described herein, which are collectively shown in FIG. 4 simply as repeater detection step 414, which generates repeater defects 416. For example, repeater detection step 414 may include double detection using individual test images and CRs, stacked defect detection using stacked test images and stacked reference images and/or averaged difference images, coordinate-based first RDD performed using a lower repeater threshold, at least an additional RDD using a higher repeater threshold, and any other steps described herein to generate repeater defects 416 that can then be used to identify defects on the reticle.

Figure 8:
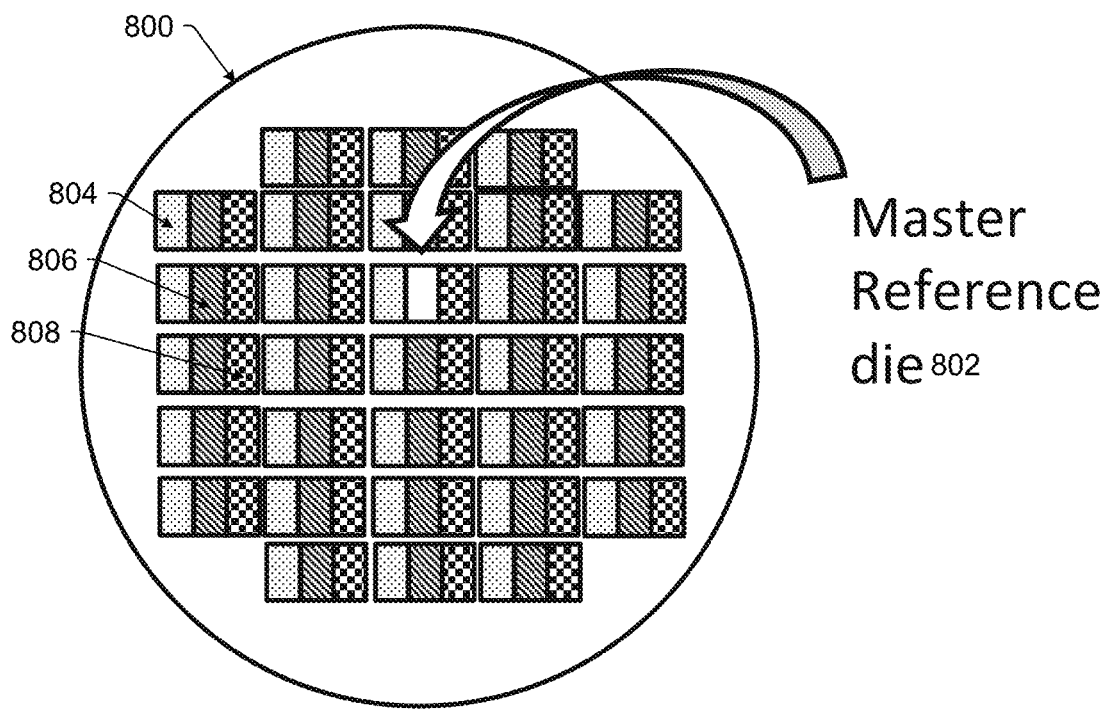
FIG. 8 is a schematic diagram illustrating a plan view of a wafer printed with a multi-die reticle (MDR) and dies selected for different purposes in the embodiments described herein.

MDR training may include generating a master reference die image. For example, the MDR training may include selecting only one die as the master reference die, generating an image of the master reference die, and storing the master reference die image for use in the MDR inspection. In one such example, wafer 800 shown in FIG. 8 shows a wafer on which a 3×1 die per reticle has been used to print features on the wafer. In this manner, each reticle instance printed on the wafer may include one of die 804, one of die 806, and one of die 808. Master reference die 802 may be selected on the wafer in any suitable manner such as that described further above.

MDR training may also include selecting alignment targets from the master die, which may be performed in any suitable manner known in the art. Alignment target locations and the master die image and information may be saved in a database during MDR training and used for runtime cross-swath image-to-image alignment performed during MDR inspection. The master reference die may be used to achieve substantially high repeater die relative location accuracy. If the MDR inspection sample plan only includes one die row, the MDR training may not be needed. All dies in the same die row can be aligned to the master reference die on the fly.

Figure 9:
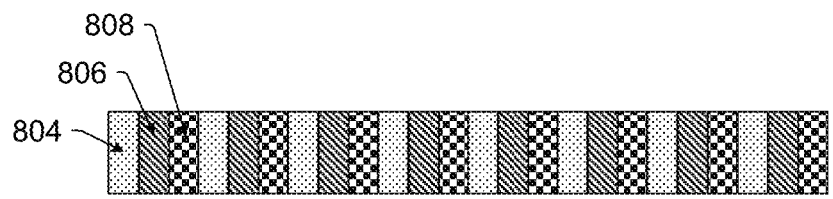
FIG. 9 is a schematic diagram illustrating a plan view of dies printed on a wafer with a MDR.

For the MDR case, there is no need to save reference images in the recipe since reticle defects are present in only one reticle die. This allows construction of the reference image for every test die in one reticle instance from other dies in the same reticle instance. FIG. 9 illustrates one example of a row of dies that may be printed on a wafer with a 3×1 reticle as described above. In particular, each reticle instance printed on the wafer may include one of dies 804, one of dies 806, and one of dies 808. Therefore, FIG. 9 shows 8 reticle instances in the die row. For dies 804, dies 806 may be used as one group of references, and dies 808 may be used as another group of references. Similarly, for dies 806, dies 804 and 808 will be used as references. For dies 808, dies 804 and 806 will be used.

In a further embodiment, the inspection subsystem is configured to generate images for pre-selected reference dies on the wafer or a training wafer, and the one or more computer subsystems are configured for separating the pre-selected reference dies into first and second groups, generating a first of the two different reference images for separately comparing to the first test image from the images generated for the pre-selected reference dies in the first group, and generating a second of the two different reference images for the separately comparing to the first test image from the images generated for the pre-selected reference dies in the second group. In this manner, reference die images may be separated into two groups to compute two reference images for every test die. A defect may be considered detected if it is detected in both comparisons: Test−Ref1 and Test−Ref2. Performing defect detection using such reference images will reduce the amount of nuisance defects, both random and systematic. Nuisance defects are any detected repeaters which are not caused by defects on the reticle.

In the case of SDR inspection, then, all reference dies from the SDR training phase may be divided into two groups for double detection. From each reference group, compute-reference is used to generate one CR for each test image. Each test image has two CRs, with one from each reference group. Each test image is separately compared with the two CRs separately for double detection.

The same two CRs may be used for double detection in each test image examined in SDR inspection. However, different CRs may be used for double detection in different test images. For example, the reference groups may be selected independently for each test image and therefore different reference dies may be included in reference groups for different test images. In one such embodiment, the one or more computer subsystems are configured for selecting the pre-selected reference dies for the first and second groups based on a location of a die on the wafer in which the first test image was generated. For example, information about where on a wafer a test image was generated may be used to select different groups of reference images for the test image. In one such example, based on information about where on a wafer a test image was generated and information about the noise characteristics of images typically generated in that area, reference groups that include reference images generated at locations on the wafer having similar noise characteristics to the test image may be selected. Selecting the reference groups in this manner may help to reduce noise and nuisance detected in the difference images generated by subtracting the different CRs from the test image. Such dynamic CR generation performed on a per test image basis may be otherwise performed as described herein.

In the case of MDR inspection, from each reference group, e.g., as shown in FIG. 9, for dies 804, dies 806 would be one reference group and dies 808 would be another reference group; for dies 806, dies 804 would be one reference group and dies 808 would be another reference group; and for dies 808, dies 804 would be one reference group and dies 806 would be another reference group, compute-reference may be used to generate one CR for each test image. Each test image has two CRs with one from each reference group. Each test image is separately compared with the two CRs for double detection.

The one or more computer subsystems are also configured for detecting stacked defects in at least the first test image by separately comparing a stacked test image generated for the first test image to two different stacked reference images corresponding to the stacked test image. For example, in SDR and MDR inspection, all test images may be averaged to generate a stacked test image, and all CRs for the test image from each reference group may be averaged to generate stacked reference images. When CRs are not used for the non-stacked defect detection described above, all reference images generated at wafer locations corresponding to the wafer location of the test image may be separated into two different reference groups, which may be performed as described above, and the reference images in each reference group may be averaged to generate two stacked reference images. Each stacked test image has two stacked reference images with one from each group. Each stacked test image is separately compared with the two stacked reference images for double detection.

In this manner, generating a stacked test image, stacking the reference images selected for or corresponding to the test image, and then separately subtracting each of the stacked reference images from the stacked test image (e.g., Stacked Test−Stacked Reference 1, Stacked Test−Stacked Reference 2) may generate two different stacked difference images. Since the two different stacked difference images are themselves generated from stacked images, the difference images generated in this manner may each be a kind of averaged difference image, which may be input to a double defect detection step such as that described above (where any defect that is detected in both stacked difference images generated for a single test image is designated as a defect).

However, instead of generating a stacked test image and stacking reference images and then generating difference images from those stacked test and reference images, individual difference images may be generated from non-stacked test and reference images as described herein and then the individual difference images may be stacked or combined such as by averaging to generate an overall stacked or averaged difference image. For example, as shown in FIG. 3, individual difference images 308 generated for the double detection performed for individual test images may be input to difference image stacking step 314 that generates averaged difference images 316. In this manner, two or more of any of the difference images generated for a single test image (or for two or more test images generated at corresponding locations in a die on the wafer) may be stacked to generate an averaged difference image. Averaged difference images 316 may then be input to defect detection 318, which generates defect candidates 320. If multiple averaged difference images are generated for a single test image (or multiple test images corresponding to the same portion of the design for the reticle), then the defect detection performed in step 318 may include double detection in which a defect is designated as such only if it is detected in at least two of the averaged difference images. If only a single averaged difference image is generated for a single test image (or for multiple test images corresponding to the same portion of the design for the reticle), then the defect detection performed in step 318 may be a single defect detection in which any defects detected in the single averaged difference image are designated as defect candidates 320.

In any case, generating difference images from multiple test images and multiple reference images, whether by stacking the test and reference images or by averaging or otherwise combining difference images obtained from multiple dies, advantageously allows efficient suppression of random noise. For example, separately comparing a stacked test image generated for a first test image to two different stacked reference images produces stacked difference images for the first test image having less random noise than difference images generated from a single test image and a single reference image. The random noise suppression provided by averaging difference images may be in addition to other noise reduction provided by the embodiments described herein thereby facilitating the relatively high sensitivity achievable for the embodiments described herein.

In one embodiment, detecting the first defects includes applying a first hot threshold to results of the separately comparing each of the at least first and second test images to the two different reference images, and detecting the stacked defects includes applying a second hot threshold to results of the separately comparing the stacked test image to the two different stacked reference images. A "hot threshold" can be generally defined as a threshold used for detecting potential defects that is set intentionally at or substantially near the noise floor of the images generated by the scanning. "Hot scans" performed using a hot threshold are typically performed to detect as many potential defects and actual defects as possible to ensure that the most defects or all of the interesting defects are captured and/or to ensure that defects having relatively weak signals are captured. The hot threshold may be applied to the difference images generated as described herein, any image signals or data above the hot threshold may be identified as potential defects, and signals or data that are not above the hot threshold are not identified as potential defects.

In this manner, hot thresholds can be used in both of the defect detections described herein—individual test image double detection and stacked detection, which is advantageous for a number of reasons. In particular, the hot thresholds can be used to detect defects that have relatively weak signals or signal-to-noise ratios (SNRs), which can be important for finding repeater defects. In addition, although using hot thresholds for either or both of the defect detections described herein could be problematic for previously used RDD methods and systems, because the embodiments described herein move at least one RDD step into the front end of the inspection, the embodiments described herein can effectively handle the resulting substantially large potential defect populations.

The hot thresholds used for the different defect detections may have different values. For example, the difference images generated for the individual test image double detection and the stacked detection may have different noise characteristics. As such, the thresholds used for the different defect detections may be separately tuned during training based on the different difference images that will be generated for the different detections.

In another embodiment, detecting the stacked defects includes filtering systematic noise sources from stacked difference images generated by separately comparing the stacked test image to the two different stacked reference images and applying a threshold to the stacked difference images after the filtering. Systematic noise sources, e.g., those caused by image misregistration or pattern noise, may be suppressed using any method or system that can remove the strongest components of the difference images from the images. Such filtering may also be performed on difference images generated by the double detection (performed using non-stacked images) described herein before a defect detection threshold is applied to such difference images.

The one or more computer subsystems are further configured for performing a first RDD by identifying any of the first defects detected at corresponding locations in two or more of the at least first and second test images and any of the stacked defects as first repeater defect candidates. For example, as shown in FIG. 3, defect candidates 312 detected by double detection on individual test images and defect candidates 320 detected using some form of image stacking may be input to first RDD step 322, which outputs repeater candidates 324, i.e., the first repeater defect candidates. Any of defect candidates 312 that are detected at corresponding locations in two or more of at least two of the test images may be designated as repeater candidates 324 and all of defect candidates 320 may be designated as repeater candidates 324. In this manner, the first RDD may be a coordinate-based repeater detection.

Repeater detection is performed at least twice by the embodiments described herein (once in the first RDD and at least one more time in an additional RDD described further herein). In this first RDD, repeater detection is started with a substantially low repeater threshold (e.g., 2). If there are two defects in different dies at the same coordinates (within a user-defined tolerance) or a defect detected in the stacked (averaged) difference image, the first RDD may identify them as first repeater defect candidates.

What qualifies as corresponding locations in the first RDD step and other steps described herein may vary depending on the ability of the embodiments described herein to align different images to a common reference. In general, corresponding locations means the same or substantially the same location in more than one die printed on a wafer. Therefore, corresponding locations in the context of the RDD steps described herein may have the same or substantially the same die coordinates. Substantially the same die coordinates may be identified by using some repeater distance threshold that defines how close two die coordinates have to be in order to be determined as locations of die repeaters. For example, minor errors in the printing of the design on the wafer, the positioning elements of the inspection subsystem, etc. may cause two identical within die locations to have slightly or somewhat different die coordinates determined for them. In this manner, it may be useful to use a tolerance for determining which within die coordinates can be considered to be the same. The specific values of that tolerance can be determined in any of the commonly used ways for determining such a tolerance and based on at least the information described above. The embodiments described herein, however, may provide better alignment between different images and therefore better accuracy in the die coordinates. For example, using a master reference die as described herein as a common reference for alignment of multiple images to each other may provide substantially high accuracy alignment of the multiple images to each other, which will improve the ability to accurately perform RDD based on die coordinates.

In one embodiment, at least the first RDD is performed prior to a post-processing phase that includes one or more steps performed after all of the images are generated for the wafer by the inspection subsystem. In this manner, the first RDD may be a coordinate-based repeater detection implemented in the front end of inspection, which is a substantially strong filter allowing efficient removal of random defects thus bringing the defect density to manageable levels. The front end inspection processing may be performed on image computers included in the one or more computer subsystems described herein.

The first repeater defect candidates may be replicated into every die. These are locations considered suspicious that are to be scrupulously validated in the front-end post-processing algorithm. The validation of the locations considered suspicious is performed by nuisance filtering or a nuisance event filter (NEF). For example, as shown in FIG. 3, repeater candidates 324 may be input to location replication step 325. Location replication may include designating locations, which correspond to a location at which a defect was detected at in at least two difference images or stacked difference images, in difference images in which the defect was not detected as defect locations. In one such example, the one or more computer subsystems may designate locations in each die corresponding to repeater candidates as defective even if defects were not detected at each location and then may examine each of the locations in more detail for actual defects. In this manner, location replication may be a kind of forced or artificial defect designation so that locations corresponding to a detected defect, but at which a defect was not detected, can be examined further by the embodiments described herein.

In one embodiment, the one or more computer subsystems are configured for filtering the first repeater defect candidates prior to performing the at least one additional RDD described further herein based on local and global SNRs for the first repeater defect candidates. For example, additional attributes may be calculated for the first repeater defect candidates: local and global SNR. These SNR values may be determined by calculating signal over the detected pixels and noise from the undetected ones in the defect neighborhood. The local SNR and global SNR attributes are used to remove nuisance repeaters. In this manner, the embodiments described herein may use SNR based nuisance suppression thereby allowing extremely hot pre-nuisance event filter (NEF) inspection.

The filtering described above may be performed with or without location replication. For example, the results of location replication step 325 shown in FIG. 3 may be input to SNR filtering step 326, which may be performed as described further herein, thereby generating defect candidates 328. The local SNR is calculated from the difference image on each die. In one such embodiment, the one or more computer subsystems are configured for determining the local SNRs for the first repeater defect candidates, and determining the local SNRs includes determining a SNR at a location of one of the first repeater defect candidates in each difference image generated by separately comparing each of the at least first and second test images to the two different reference images even if the one of the first repeater defect candidates was not detected in each difference image. For example, as described above, the computer subsystem(s) may perform location replication 325 so that non-detected locations can be examined further for weaker or undetected repeater defects. SNR filtering 326 may then be performed using the results of location replication 325, which include locations of both the first repeater defect candidates and non-detected locations corresponding to the first repeater defect candidates. In this manner, because defect detection in individual frames (dies) may not detect the repeater instance on every die, local SNR and global SNR values may be calculated at replicated locations and are used to do detailed examination of actual defects and nuisance filtering.

In another such embodiment, determining the local SNRs includes comparing the SNR determined at the location of the one of the first repeater defect candidates in two of each difference images generated for the first test image and selecting the SNR having a higher value as the local SNR in the first test image for the one of the first repeater defect candidates. For example, the strongest values from the two comparisons, i.e., max(Test−Ref1, Test−Ref2) is used. This approach allows the embodiments to keep weaker defects for further processing.

In a further such embodiment, the one or more computer subsystems are configured for determining the global SNRs, and determining one of the global SNRs for one of the first repeater defect candidates includes determining a SNR at a location at which the one of the first repeater defect candidates was detected in an average of multiple difference images. In other words, global SNR is calculated from the stacked difference images, which may be constructed in one of the various ways described herein such as by averaging difference images from all dies. The average of the multiple difference images may be generated by generating individual difference images and then averaging them or generating individual difference images from a stacked test image and two different stacked reference images. In this manner, the global SNRs as described herein are determined from difference images generated from more than one test image.

In another such embodiment, the multiple difference images include difference images in which the one of the first repeater defect candidates was detected and difference images in which the one of the first repeater defect candidates was not detected. For example, as described above, the global SNRs may be used in combination with location replication. In this manner, the global SNRs may be determined from difference images generated for one or more corresponding locations on the wafer, which may include locations at which repeater defect candidates were detected as well as locations at which the repeater defect candidates were not detected. The location replication that is used with global SNR nuisance filtering may be performed as described above. The global SNRs used with location filtering may be determined as described above.

NEF removes many defects with weaker global SNR or local SNR and repeater candidates at 324 may become non-repeaters. Thus the second round of repeater detection is performed to remove non-repeaters. The one or more computer subsystems are further configured for performing at least one additional RDD to thereby identify final repeater defect candidates. For example, as shown in FIG. 3, defect candidates 328 output by SNR filtering step 326 may be input to RDD 330, which may include at least one additional RDD thereby generating repeaters 332, which may be the final repeater defect candidates.

In one embodiment, the at least one additional RDD includes identifying any of the first defects detected at corresponding locations in more than two of the at least first and second test images or any of the stacked defects as the final repeater defect candidates. In this manner, a higher repeater threshold may be used in the at least one additional RDD compared to the first RDD. For example, in the first RDD, a repeater defect candidate may be any defect detected in at least two of the test images (i.e., ≥2 test images) by double detection and/or any defect detected via stacking. In the at least one additional RDD, a repeater defect candidate may be any defect detected in more than two of the test images (i.e., >2 test images) by double detection and/or any defect detected via stacking. In this manner, the at least one additional RDD may further reduce nuisance defects or non-repeating defects after NEF. Therefore, both of the RDD steps described herein may be coordinate based RDD but using different repeater thresholds for how many times a defect is required to appear to be considered a repeater defect candidate.

The one or more computer subsystems are also configured for identifying defects on the reticle based on the final repeater defect candidates. For example, the final repeater defect candidates may all be identified as defects on the reticle. Such acceptance of all of the final repeater defect candidates as reticle defects may be appropriate when the defect detection steps described herein detect substantially little nuisance and/or when the nuisance filtering steps are substantially effective at suppressing (e.g., eliminating) nuisance. However, identifying the defects on the reticle based on the final repeater defect candidates may optionally include some additional analysis of the final repeater defect candidates. For example, repeaters 332 may be input to repeater analysis 334, which may include any suitable post-processing known in the art such as defect classification (e.g., via design based grouping or another suitable defect classification method or algorithm). Repeater analysis may also include sampling defects for review, which may be performed on a subset of all of the final repeater defect candidates to verify and/or classify the sampled defects. Such review sampling may generate review samples 336 that include information for the selected subset of the final repeater defect candidates, which can then be sent to a defect review tool (not shown) that performs the defect review. The repeater analysis may also include checking for repeaters across multiple die rows when any one RDD step is performed for only one die row and/or multiple RDD steps are performed separately for different die rows on a wafer.

Identifying the defects on the reticle may also include determining if the final repeater defect candidates are detected at the same or substantially the same reticle coordinates. Substantially the same reticle coordinates may be identified by using some repeater distance threshold that defines how close two reticle coordinates have to be determined as locations of reticle repeaters. For example, minor errors in the printing of the design on the wafer, the positioning elements of the inspection subsystem, etc. may cause two identical within reticle locations to have slightly or somewhat different reticle coordinates determined for them. In this manner, it may be useful to use a tolerance for determining which reticle coordinates can be considered to be the same. The specific values of that tolerance can be determined in any of the commonly used ways for determining such a tolerance and based on at least the information described above.

For the purpose of the applications described herein, the user wants to keep only reticle repeaters. Die repeaters for MDR should be removed from the final report. In particular, the embodiments described herein were created for applications in which the user is looking for the repeater defects that are produced due to problems with the reticle (photomask). Defects that are present at the same location in different dies on the same reticle are, most likely, caused by wafer processing—not by the reticle itself.

In other words, defects that appear on the wafer at substantially the same location in multiple dies of a single reticle are likely not due to actual reticle defects such as a damaged patterned feature, a particle or foreign matter, and the like. Instead, if a defect repeats on a wafer in multiple dies in a reticle, the defects on the wafer that repeat in the dies are likely due to an interaction issue between the reticle, wafer, and process (e.g., a marginal design that is failing due to a design/process interaction issue). While such die repeater defects may be interesting in some use cases, the embodiments described herein have been created specifically for detecting defects that repeat from printed reticle instance to printed reticle instance and can therefore be assumed to be caused by reticle defects.

In some instances, the defects will not be reported in reticle coordinates by the computer subsystem(s). In other words, when the computer subsystem(s) detect a defect, the coordinates of the location of that defect may not be determined by the computer subsystem(s) with respect to a reticle. In this manner, the coordinates of the defects determined by the computer subsystem(s) may be translated into reticle coordinates by the computer subsystem(s) or another system or method. The coordinates may be translated in a number of different ways. For example, one relatively straightforward way is to translate the coordinates reported for the defects to a reference that is common to the wafer and the reticle such as a design for the wafer and the reticle. In one such example, the images generated for the defects by the inspection subsystem can be aligned to the design for the wafer. Once the design coordinates of the defects are determined, those coordinates can be translated to reticle coordinates based on the known relationship between the design and the reticle. The reticle coordinates determined for each of the defects can then be compared to each other, and defects having substantially the same reticle coordinates can be identified as reticle repeaters.

The computer subsystem(s) may preferably store information for all of the detected defects such that the information for all of the detected defects is available for RDD. Once RDD is performed by the computer subsystem(s), the information that was stored for defects determined to not be repeaters may be eliminated from the stored information prior to sending that information to another computer subsystem(s), another method, back to storage, etc.

All of the methods described herein may include storing results of one or more steps of the method embodiments in a computer-readable storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. For example, the defects detected on the reticle may be used to control and/or alter a reticle repair or cleaning process in which the goal is to remove or repair one or more reticle defects to thereby prevent such reticle defects from being printed on other wafers. In one such example, information for the defects detected on the reticle may be used by the one or more computer subsystems described herein, another system (e.g., a reticle repair system), or another method (e.g., a reticle repair method) to determine where on a reticle a reticle repair or cleaning process should be performed. The information for the defects detected on the reticle may also be used to determine one or more parameters of such a process such as the area on which the process is to be performed, the length of time that the process is to be performed, which chemicals or gases should be used in the process, etc. In this manner, the altered reticle can be used to print the dies on the reticle on other wafers in the lithography process. The altered reticle may also be re-inspected using the embodiments described herein at another time after it has been re-introduced to the lithography process.

The embodiments described above have, therefore, a number of advantages over currently used methods and systems for RDD. For example, the new approaches described above allow for increased sensitivity for repeater defects. Increased sensitivity for RDD is important for a number of applications. In one example, the introduction of EUV lithography processes into semiconductor manufacturing requires frequent mask inspection (these masks are more susceptible to defects because the masks do not have pellicles and may be exposed during operation) and moves the operation from the mask inspector (there are no mask inspectors with actinic light for EUV) to the wafer inspector. Repeater defects for EUV are expected to be substantially small and/or weak and may be printed only on several dies on the wafer. In order to find such defects, the wafer inspector has to process huge numbers of candidate defects, which cannot be done with the current approaches. In addition, the introduction of EUV lithography raises the necessity for robust detection of repeater defects.

The embodiments described herein may be used with other methods and systems for or related to RDD such as those described in U.S. Pat. No. 9,766,186 to Chen et al. issued Sep. 19, 2017, U.S. Pat. No. 9,766,187 to Chen et al. issued Sep. 19, 2017, U.S. Pat. No. 10,127,652 to Gao et al. issued Nov. 13, 2018, U.S. Pat. No. 10,365,232 to Suman et al. issued Jul. 30, 2019, U.S. Pat. No. 10,395,358 to Brauer et al. issued Aug. 27, 2019, and U.S. Pat. No. 10,648,925 to Shifrin et al. issued May 12, 2020, and U.S. Patent Application Publication Nos. 2018/0342051 to Sezginer et al. published Nov. 29, 2018, 2020/0072763 to Suman et al. published Mar. 5, 2020, 2020/0244963 to Patwary et al. published Jul. 30, 2020, and 2021/0090229 to Brauer et al. published Mar. 25, 2021, all of which are incorporated by reference as if fully set forth herein. The embodiments described herein may be further configured as described in these patents and publications.

Each of the embodiments of the system described herein may be combined with any other embodiments of the system described herein.

Another embodiment relates to a computer-implemented method for detecting defects on a reticle. The method includes acquiring images generated for a wafer by an inspection subsystem. A reticle is used to print features on the wafer in a lithography process. The method includes the detecting first defects, detecting stacked defects, performing a first RDD, performing at least one additional RDD, and identifying defects steps described above, which are performed by one or more computer subsystems coupled to the inspection subsystem.

Each of the steps of the method may be performed as described further herein. The method may also include any other step(s) that can be performed by the inspection subsystem and/or computer subsystem(s) or system(s) described herein, which may be configured according to any of the embodiments described herein. In addition, the method described above may be performed by any of the system embodiments described herein.

Figure 10:
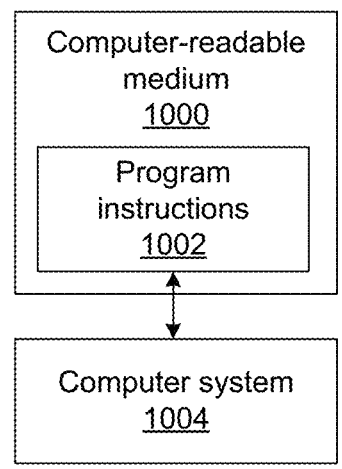
FIG. 10 is a block diagram illustrating one embodiment of a non-transitory computer-readable medium storing program instructions executed on a computer system for performing one or more of the computer-implemented methods described herein.

An additional embodiment relates to a non-transitory computer-readable medium storing program instructions executed on a computer system for performing a computer-implemented method for detecting defects on a reticle. One such embodiment is shown in FIG. 10. In particular, as shown in FIG. 10, non-transitory computer-readable medium 1000 includes program instructions 1002 executable on computer system 1004. The computer-implemented method may include any step(s) of any method(s) described herein.

Program instructions 1002 implementing methods such as those described herein may be stored on computer-readable medium 1000. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired.

Computer system 1004 may be configured according to any of the embodiments described herein.

Further modifications and alternative embodiments of various aspects of the invention will be apparent to those skilled in the art in view of this description. For example, systems and methods for detecting defects on a reticle are provided. Accordingly, this description is to be construed as illustrative only and for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system configured to detect defects on a reticle, comprising:
   an inspection subsystem configured to generate images for the wafer, wherein a reticle is used to print features on the wafer in a lithography process; and
   one or more computer subsystems configured for:
      detecting first defects in at least first and second test images included in the images, wherein detecting the first defects comprises separately comparing each of the at least first and second test images to two different reference images corresponding to said each of the at least first and second test images, and wherein the at least first and second test images correspond to different instances of the same area on the reticle printed on the wafer;
      detecting stacked defects in at least the first test image by separately comparing a stacked test image generated for the first test image to two different stacked reference images corresponding to the stacked test image;
      performing a first repeater defect detection by identifying any of the first defects detected at corresponding locations in two or more of the at least first and second test images and any of the stacked defects as first repeater defect candidates;
      performing at least one additional repeater defect detection on the first repeater defect candidates to thereby identify final repeater defect candidates; and
      identifying defects on the reticle based on the final repeater defect candidates.

2. The system of claim 1, wherein the inspection subsystem is further configured to generate images for a pre-selected master die on the wafer or a training wafer, and wherein the one or more computer subsystems are further configured for performing runtime alignment of at least the different reference images to the images generated for the pre-selected master die prior to detecting the first defects and detecting the stacked defects.

3. The system of claim 1, wherein the inspection subsystem is further configured to generate images for pre-selected reference dies on the wafer or a training wafer, and wherein the one or more computer subsystems are further configured for selecting the two different reference images for the separately comparing to said each of the at least first and second test images from the images generated for the pre-selected reference dies.

4. The system of claim 1, wherein the inspection subsystem is further configured to generate images for pre-selected reference dies on a training wafer, and wherein the one or more computer subsystems are further configured for storing the images for the pre-selected reference dies and dynamically generating the two different reference images for the separately comparing to said each of the at least first and second test images from the images generated for the pre-selected reference dies.

5. The system of claim 1, wherein the inspection subsystem is further configured to generate images for pre-selected reference dies on the wafer or a training wafer, and wherein the one or more computer subsystems are further configured for separating the pre-selected reference dies into first and second groups, generating a first of the two different reference images for the separately comparing to the first test image from the images generated for the pre-selected reference dies in the first group, and generating a second of the two different reference images for the separately comparing to the first test image from the images generated for the pre-selected reference dies in the second group.

6. The system of claim 5, wherein the one or more computer subsystems are further configured for selecting the pre-selected reference dies for the first and second groups based on a location of a die on the wafer in which the first test image was generated.

7. The system of claim 1, wherein the one or more computer subsystems are further configured for filtering the first repeater defect candidates prior to performing the at least one additional repeater defect detection based on local and global signal-to-noise ratios for the first repeater defect candidates.

8. The system of claim 7, wherein the one or more computer subsystems are further configured for determining the local signal-to-noise ratios for the first repeater defect candidates, and wherein determining the local signal-to-noise ratios comprises determining a signal-to-noise ratio at a location of one of the first repeater defect candidates in each difference image generated by the separately comparing said each of the at least first and second test images to the two different reference images even if the one of the first repeater defect candidates was not detected in said each difference image.

9. The system of claim 8, wherein determining the local signal-to-noise ratios further comprises comparing the signal-to-noise ratio determined at the location of the one of the first repeater defect candidates in two of said each difference images generated for the first test image and selecting the signal-to-noise ratio having a higher value as the local signal-to-noise ratio in the first test image for the one of the first repeater defect candidates.

10. The system of claim 7, wherein the one or more computer subsystems are further configured for determining the global signal-to-noise ratios, and wherein determining one of the global signal-to-noise ratios for one of the first repeater defect candidates comprises determining a signal-to-noise ratio at a location at which the one of the first repeater defect candidates was detected in an average of multiple difference images.

11. The system of claim 10, wherein the multiple difference images comprise difference images in which the one of the first repeater defect candidates was detected and difference images in which the one of the first repeater defect candidates was not detected.

12. The system of claim 1, wherein detecting the first defects comprises applying a first hot threshold to results of the separately comparing said each of the at least first and second test images to the two different reference images, and wherein detecting the stacked defects comprises applying a second hot threshold to results of the separately comparing the stacked test image to the two different stacked reference images.

13. The system of claim 1, wherein detecting the stacked defects comprises filtering systematic noise sources from stacked difference images generated by the separately comparing the stacked test image to the two different stacked reference images and applying a threshold to the stacked difference images after the filtering.

14. The system of claim 1, wherein the separately comparing the stacked test image generated for the first test image to the two different stacked reference images produces stacked difference images for the first test image having less random noise than difference images generated from a single test image and a single reference image.

15. The system of claim 1, wherein the at least one additional repeater defect detection comprises identifying any of the first defects detected at corresponding locations in more than two of the at least first and second test images or any of the stacked defects as the final repeater defect candidates.

16. The system of claim 1, wherein at least the first repeater defect detection is performed prior to a post-processing phase comprising one or more steps performed after all of the images are generated for the wafer by the inspection subsystem.

17. The system of claim 1, wherein the reticle is a single die reticle.

18. The system of claim 1, wherein the reticle is a multiple die reticle.

19. The system of claim 1, wherein the reticle is configured for use at an extreme ultraviolet wavelength.

20. A non-transitory computer-readable medium, storing program instructions executed on one or more computer subsystems for performing a computer-implemented method for detecting defects on a reticle, wherein the computer-implemented method comprises:
acquiring images generated for a wafer by an inspection subsystem, wherein a reticle is used to print features on the wafer in a lithography process;
detecting first defects in at least first and second test images included in the images, wherein detecting the first defects comprises separately comparing each of the at least first and second test images to two different reference images corresponding to said each of the at least first and second test images, and wherein the at least first and second test images correspond to different instances of the same area on the reticle printed on the wafer;
detecting stacked defects in at least the first test image by separately comparing a stacked test image generated for the first test image to two different stacked reference images corresponding to the stacked test image;
performing a first repeater defect detection by identifying any of the first defects detected at corresponding locations in two or more of the at least first and second test images and any of the stacked defects as first repeater defect candidates;
performing at least one additional repeater defect detection on the first repeater defect candidates to thereby identify final repeater defect candidates; and
identifying defects on the reticle based on the final repeater defect candidates, wherein acquiring the images, detecting the first defects, detecting the stacked defects, performing the first repeater defect detection, performing the at least one additional repeater defect detection, and identifying the defects on the reticle are performed by the one or more computer subsystems coupled to the inspection subsystem.

21. A computer-implemented method for detecting defects on a reticle, comprising:
acquiring images generated for a wafer by an inspection subsystem, wherein a reticle is used to print features on the wafer in a lithography process;
detecting first defects in at least first and second test images included in the images, wherein detecting the first defects comprises separately comparing each of the at least first and second test images to two different reference images corresponding to said each of the at least first and second test images, and wherein the at least first and second test images correspond to different instances of the same area on the reticle printed on the wafer;
detecting stacked defects in at least the first test image by separately comparing a stacked test image generated for the first test image to two different stacked reference images corresponding to the stacked test image;
performing a first repeater defect detection by identifying any of the first defects detected at corresponding locations in two or more of the at least first and second test images and any of the stacked defects as first repeater defect candidates;
performing at least one additional repeater defect detection on the first repeater defect candidates to thereby identify final repeater defect candidates; and
identifying defects on the reticle based on the final repeater defect candidates, wherein acquiring the images, detecting the first defects, detecting the stacked defects, performing the first repeater defect detection, performing the at least one additional repeater defect detection, and identifying the defects on the reticle are performed by one or more computer subsystems coupled to the inspection subsystem.

* * * * *